(12) United States Patent
Ganthev

(10) Patent No.: US 6,505,722 B1
(45) Date of Patent: Jan. 14, 2003

(54) HYDRAULIC DIFFERENTIAL

(76) Inventor: Stilian Tzonev Ganthev, H.k. "Mladost-2", B1.110, Vh.8, App. 166, 9027 Varna (BG)

( * ) Notice: Subject to any disclaimer, the term of this patent is extended or adjusted under 35 U.S.C. 154(b) by 0 days.

(21) Appl. No.: 09/831,517
(22) PCT Filed: Nov. 10, 1999
(86) PCT No.: PCT/BG99/00024
§ 371 (c)(1), (2), (4) Date: Aug. 1, 2001
(87) PCT Pub. No.: WO00/28240
PCT Pub. Date: May 18, 2000

(30) Foreign Application Priority Data

Nov. 11, 1998 (BG) .............................................. 102914

(51) Int. Cl.[7] ............................................. F16H 39/40
(52) U.S. Cl. ......................... 192/48.8; 192/61; 475/90; 475/94
(58) Field of Search ..................... 192/48.1, 61, 48.8, 192/49, 103 F; 475/90, 91, 93, 94

(56) References Cited

U.S. PATENT DOCUMENTS

| | | | |
|---|---|---|---|
| 2,209,949 A | | 8/1940 | McCormack ................ 192/61 |
| 4,272,993 A | * | 6/1981 | Kopich ........................ 475/90 |
| 4,630,505 A | * | 12/1986 | Williamson ................... 475/90 |
| 5,042,630 A | * | 8/1991 | Hutchison ............... 192/103 F |
| 5,078,661 A | * | 1/1992 | Esaki .......................... 475/249 |
| 5,127,888 A | * | 7/1992 | Esaki .......................... 475/90 |
| 6,189,668 B1 | * | 2/2001 | Richards ..................... 180/246 |

FOREIGN PATENT DOCUMENTS

DE 816479 8/1951

* cited by examiner

Primary Examiner—Saul Rodriguez
(74) Attorney, Agent, or Firm—Webb Ziesenheim Logsdon Orkin & Hanson, P.C.

(57) ABSTRACT

The present invention relates to axle and intermediate differential mechanisms applicable in vehicles. The inventive differential distributes the torque to the driven shafts automatically and in proportion to the loadings without mounting of any additional control means and actuating means. The proposed construction includes two hydraulic volumetric clutches having a common drive part, in which the driven parts with immovably connected driven shafts are placed. Each of the hydraulic clutches has its own loop of circulating channels, which are separated by means of a common gate unit, containing a cylindrical gate with two openings. Two guide channels connect the discharged sides of the circulating channels, the suction sides of which being connected to volumetric compensators. The gate blocks hydraulically both clutches when the loads on the driven shafts are equal, and releases the less loaded shaft in case of breaking the balance proportionally to the loading.

1 Claim, 2 Drawing Sheets

A-A

HYDRAULIC DIFFERENTIAL

TECHNICAL FIELD OF THE INVENTION

The present invention relates to a hydraulic differential, which is applicable in the mechanical engineering, especially in the vehicles.

BACKGROUND OF THE INVENTION

The inadequate reactions of the differential mechanisms having two degree of freedom, and particularly of the mechanical differentials, are caused by their feature to transfer the motion to that one of the driven shafts, which is subjected to a lower resistance, while the most of the requirements to the differential mechanisms in the vehicles are satisfied by just the opposite, approach. This characteristic of the differential mechanisms leads to a restriction in their operational capabilities and to the necessity of correcting their behavior Typically this drawback is overcame by creating mechanisms for blocking the motion of that one of the shafts, the speed of rotation of which is greater, when the difference between the rotating speeds of both shafts exceeds a preset value. Depending on whether only an autoblockage for an axle differential is performed, or a precise distribution of the driving torque in case of intermediate axle differentials, there are different rates of constructive complexities and costs. A two clutch differential is known, the pressure on the clutches being adjusted continuously.

Some constructions combine antiblocking systems of the breaks, antislipping and other systems based on the estimating of one and the same parameters, sensors and actuating mechanisms, while seeking a compromise between the consumer requirements and the costs.

SUMMARY OF THE INVENTION

The technical problem is solved by a hydraulic differential including a drive gear, two volumetric hydraulic clutches, carrier housing and two output driven shafts. Both hydraulic clutches have a common drive part formed as a casing, in which the driven parts with immovably connected driven shafts are placed. Each of the hydraulic clutches has its own loop of circulating channels, which are separated into suction sides and discharge sides by means of a common gate unit, containing a cylindrical bed parallel to the common axis of rotation of both clutches. A cylindrical gate with two openings is placed into the bed between two springs. Two guide channels connect both ends of the cylindrical bed with the discharge sides of the circulating channels, the suction sides of which being connected to volumetric compensators.

The advantages of the proposed hydraulic differential are their automatic adequate and precisely balanced reaction and the simple design. There are not used any special sensing, regulating and actuating means, which lead to a decreasing of the cost.

BRIEF DESCRIPTION OF THE DRAWINGS

Further in the description an exemplary embodiment of a hydraulic differential according to the invention is described with reference to the accompanying drawings, where.

EXEMPLARY EMBODIMENTS OF THE INVENTION

Figure 1:
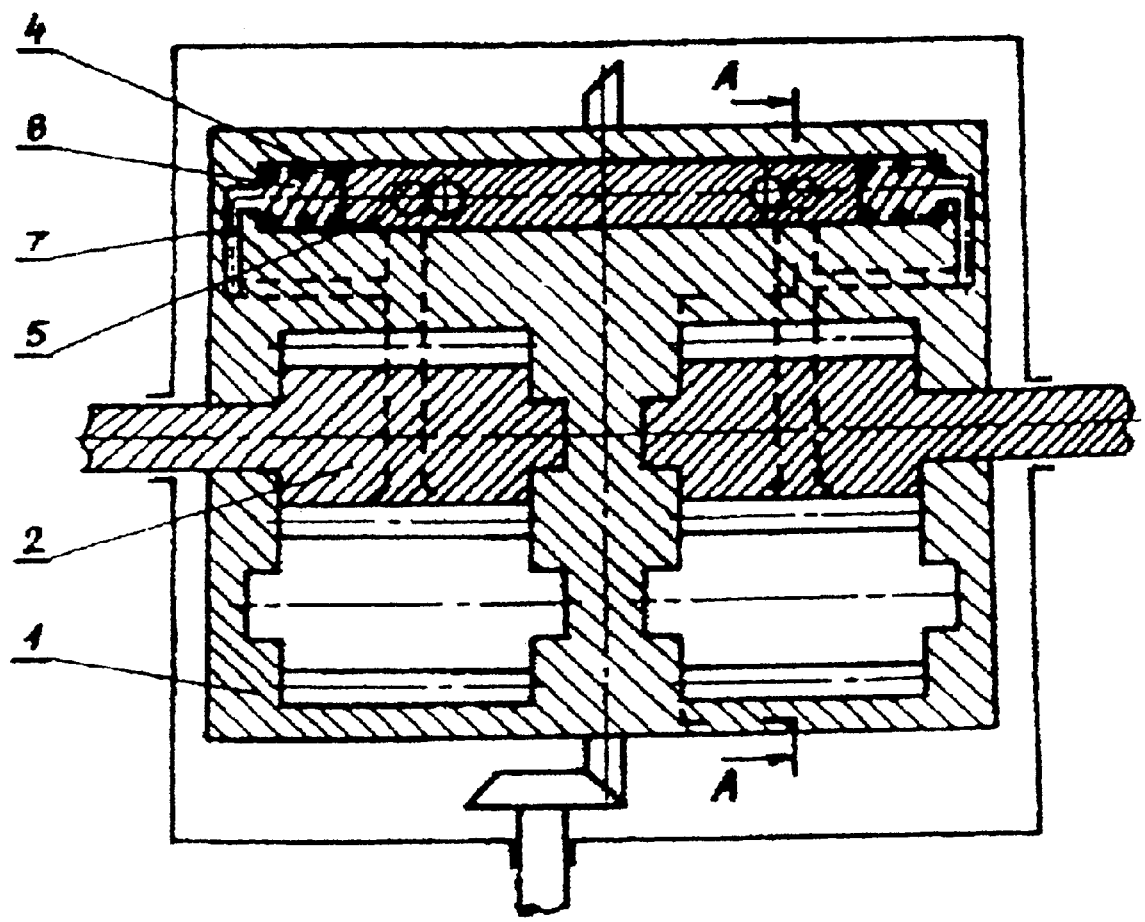
FIG. 1 is a section of a hydraulic differential having gear volumetric hydraulic clutches, each containing two gear wheels.
Figure 2:
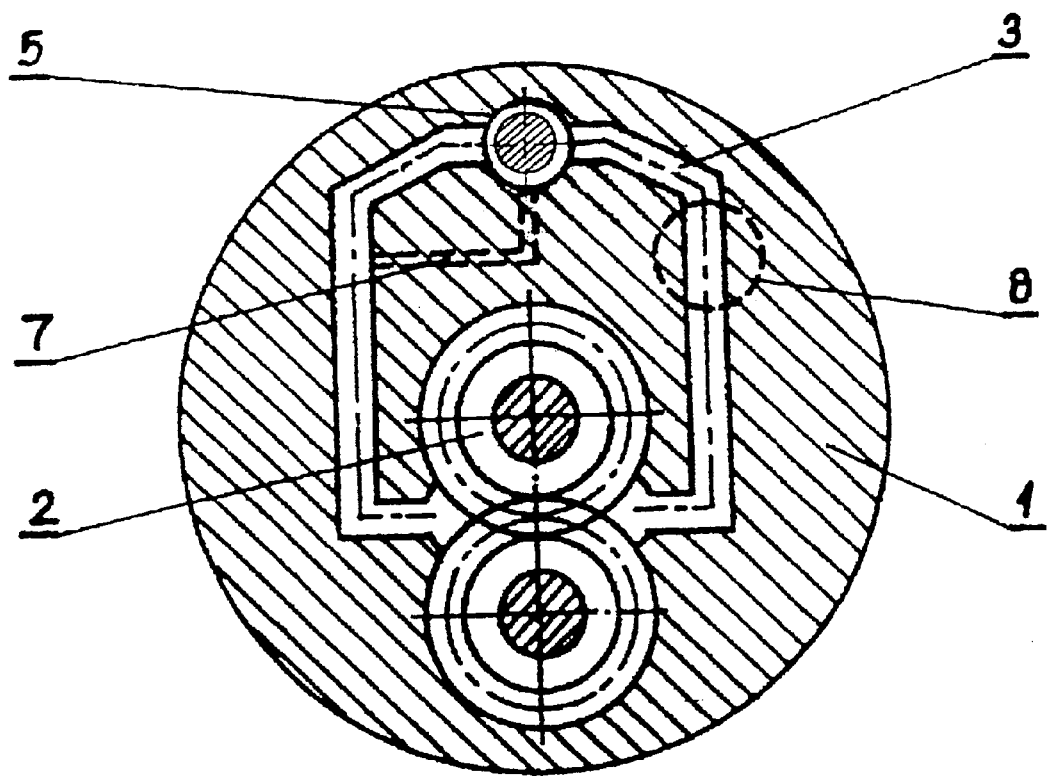
FIG. 2 is a section on line A—A in FIG. 1.

According to the description and the accompanying drawings the exemplary embodiment of the inventive hydraulic differential is constructed as follows: The common drive part of the both hydraulic clutches is formed as a casing 1, in which the driven parts 2 with immovably connected driven shafts are placed. Each of the hydraulic clutches has its own loop of circulating channels 3, which are separated into suction sides and discharge sides by means of a common gate, containing a cylindrical bed 4 parallel to the common axis of rotation of both clutches, and a cylindrical gate 5 with two openings is placed into the bed 4 between two springs 6. Two guide channels 7 connect both ends of the cylindrical bed 4 with the discharge sides of the circulating channels 3, the suction sides of which being connected to volumetric compensators 8.

OPERATION OF THE DEVICE

The hydraulic differential operates as follows: The drive transmission gear rotates the casing 1 of the hydraulic differential with all components contained within— volumetric hydromachines embodied as hydraulic clutches and the gate, closing both loops of the hydraulic clutches in equilibrium state, thus blocking them hydraulically. Each variation of the resistance on the driven shafts leads to a proportional variation of the pressure in the discharge sides of the circulating channels 3, and through the guiding channels 7 this pressure acts to the gate 5, which moves towards the loop with a lower pressure and opens it at a degree depending on the difference in the loading of the driven shafts. During the subsequent hydraulic deblocking of the hydraulic clutch the torque on the less loaded shaft decreases, and the torque on the more loaded shaft increases. Thus the torque is precisely distributed without any delay. Therefore the simple designed compact mechanism is applicable to axle differentials and to intermediate axle differentials of all kind of vehicles.

What is claimed is:

1. Hydraulic differential comprising: a drive gear, two volumetric hydraulic clutches, a carrier housing and two output driven shafts, wherein both hydraulic clutches have a common drive part formed as a casting, in which the driven parts with immovably connected driven shafts are placed, and each of the hydraulic clutches has its own loop of circulating channels, which are separated into suction sides and discharge sides by means of a common gate unit, containing a cylindrical bed parallel to the common axis of rotation of both clutches, were a cylindrical gate with two openings is placed into the bed between two springs, and two guide channels connect both ends of the cylindrical bed with the discharge sides of the circulating channels, with the suction sides thereof connected to volumetric compensators.

* * * * *